Aug. 19, 1941.   L. V. CASTO ET AL   2,253,109
SURFACE DECORATING MECHANISM
Filed Oct. 7, 1939    4 Sheets-Sheet 1

INVENTORS.
LLOYD V. CASTO
GUIDO VON WEBERN
EDWARD W. HAMANT
BY
Fay, Golrick, Williams & Fay
ATTORNEYS.

Aug. 19, 1941. L. V. CASTO ET AL 2,253,109
SURFACE DECORATING MECHANISM
Filed Oct. 7, 1939 4 Sheets-Sheet 2

INVENTORS
LLOYD V. CASTO
GUIDO VON WEBERN
EDWARD W. HAMANT

Patented Aug. 19, 1941

2,253,109

UNITED STATES PATENT OFFICE 2,253,109

SURFACE DECORATING MECHANISM

Lloyd V. Casto, Detroit, Mich., and Guido von Webern and Edward William Hamant, Dayton, Ohio, assignors to Oxford Varnish Corporation, Detroit, Mich., a corporation of Michigan Application October 7, 1939, Serial No. 298,410

14 Claims. (Cl. 101—35)

This invention relates to a surface decorating mechanism and more particularly to a surface decorating or graining mechanism which will be especially adapted to apply a decorated coating or design to the external surface of workpieces, such as side walls thereof in one continuous operation.

These, therefore, are the general objects of the present invention. A more specific object is to provide a mechanism for applying a continuous decorative coating to angularly displaced external surfaces of a workpiece, such as, for instance, adjacent sides of a box, cabinet or frame.

Another object of this invention is to provide a surface decorating or graining machine having an improved form of work handling mechanism for advancing the work into contact with the decorating members thereof, together with a mechanism for advancing the work while the decorating coating is being applied thereto.

A further object of the present invention is to provide an improved surface decorating machine in which a design or pattern will be applied to the external surfaces of the workpieces in such a manner as to cause substantially the same portion of the design to be applied to corresponding areas of the different workpieces.

Another object of this invention is to provide an improved surface decorating machine of the vertical roll type in which the work is positively presented to the decorating position in such manner as to insure the application of the same design to each of a plurality of pieces of work in the same predetermined manner.

Other objects and features of this invention will become more apparent from the following description which relates to a preferred embodiment of the invention illustrated in the accompanying drawings. The essential features of the invention will be summarized in the claims.

Figure 1:
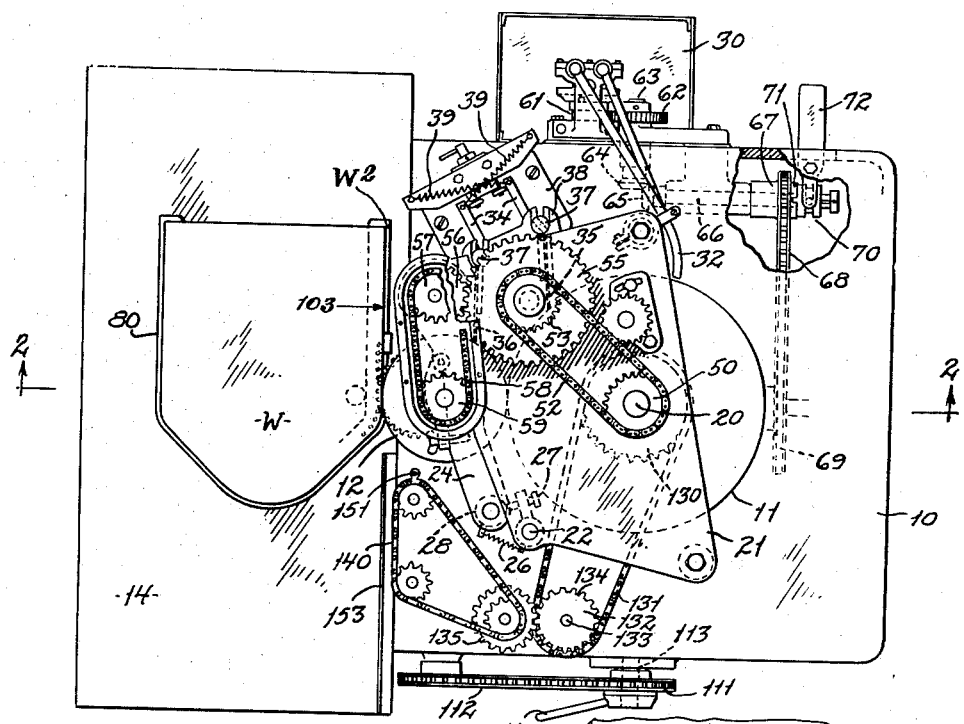
Figure 4:
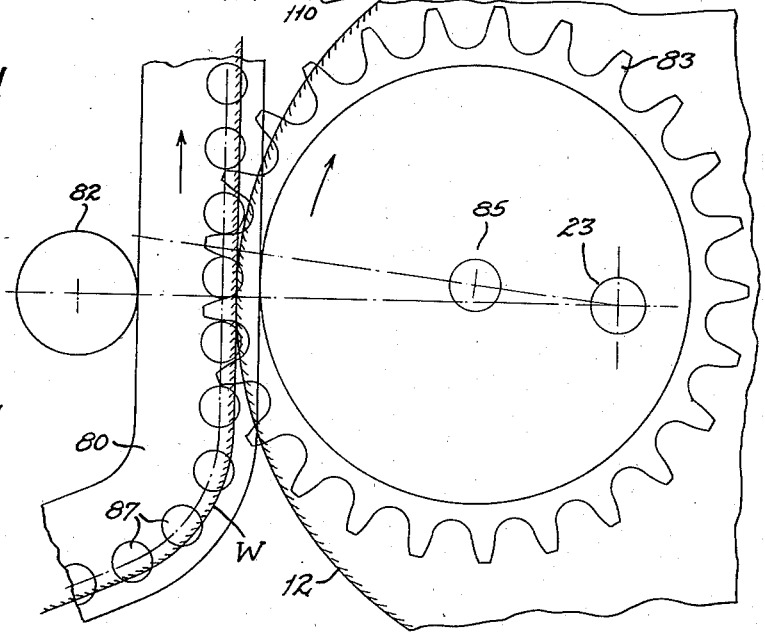
Figure 2:
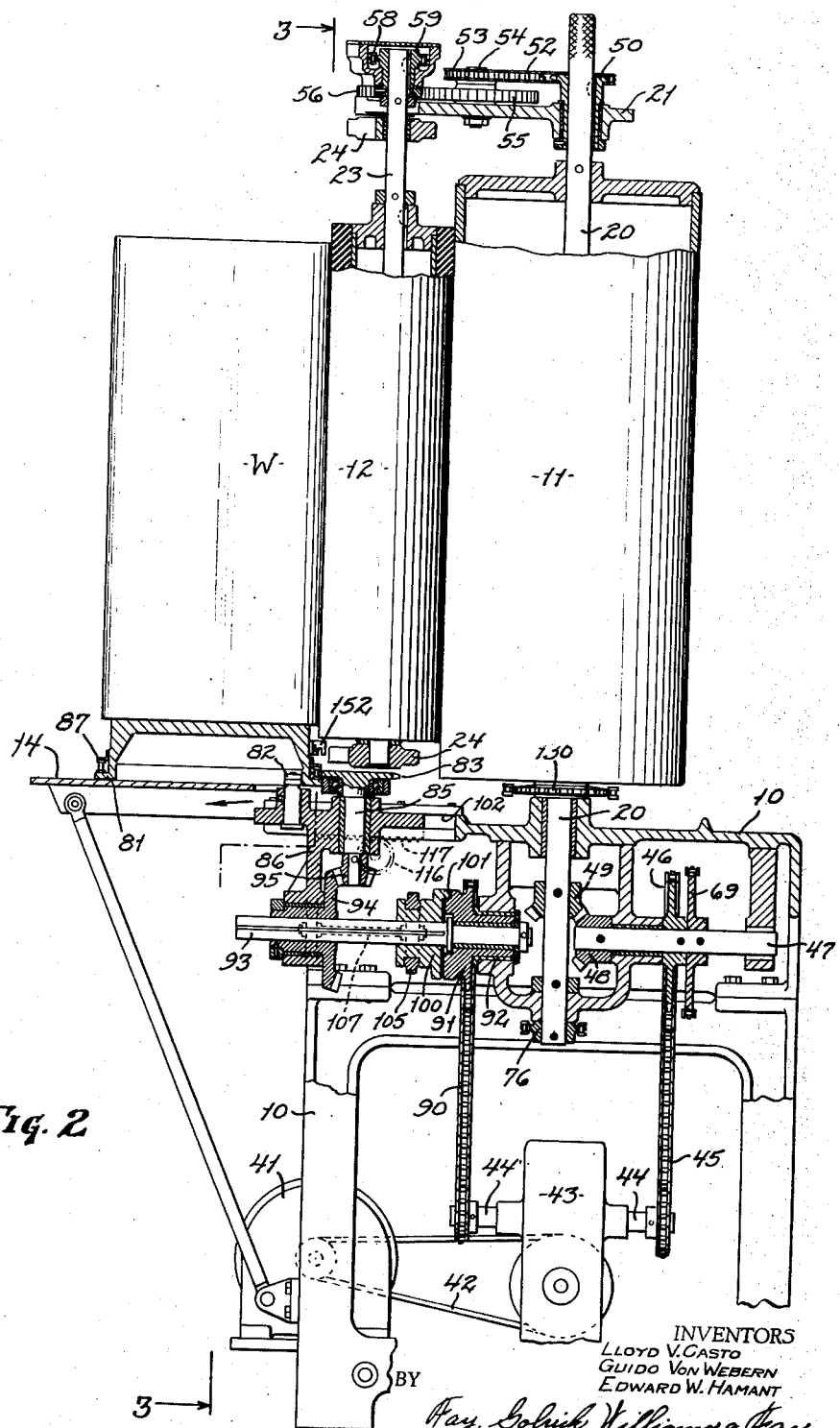
Figure 3:
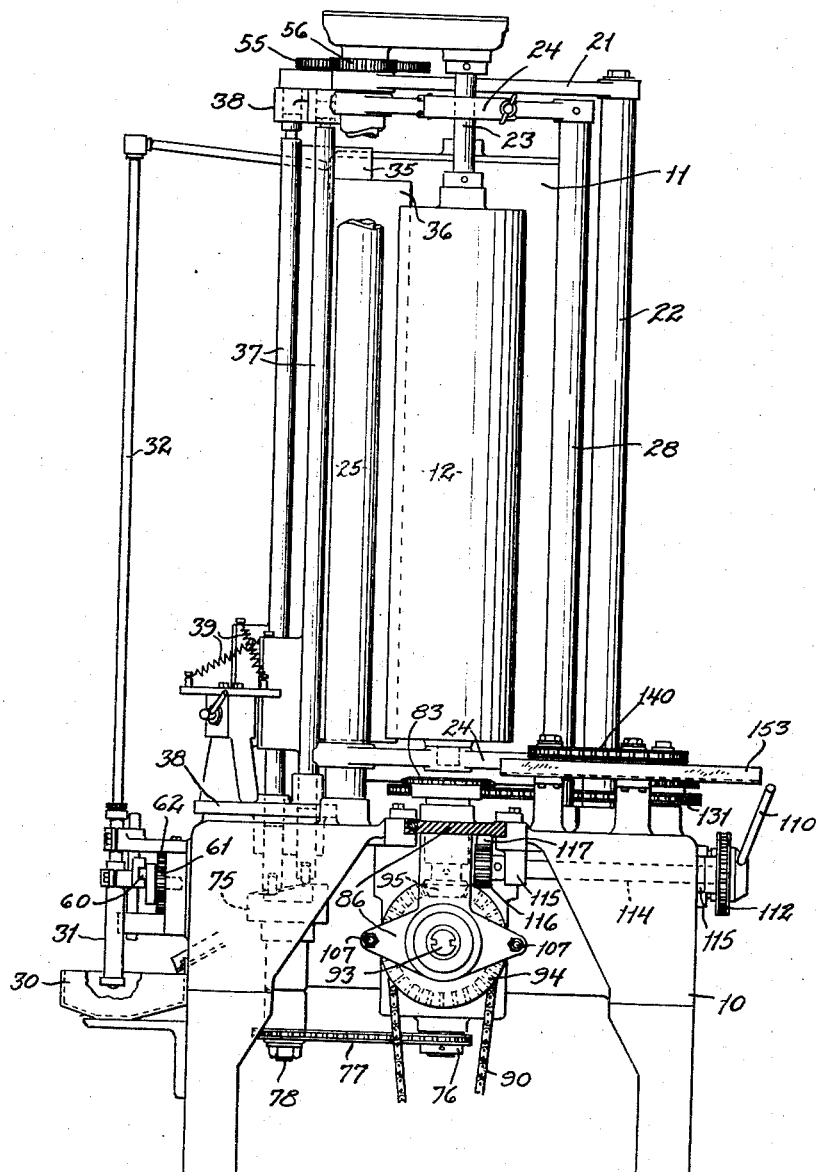
Figure 5:
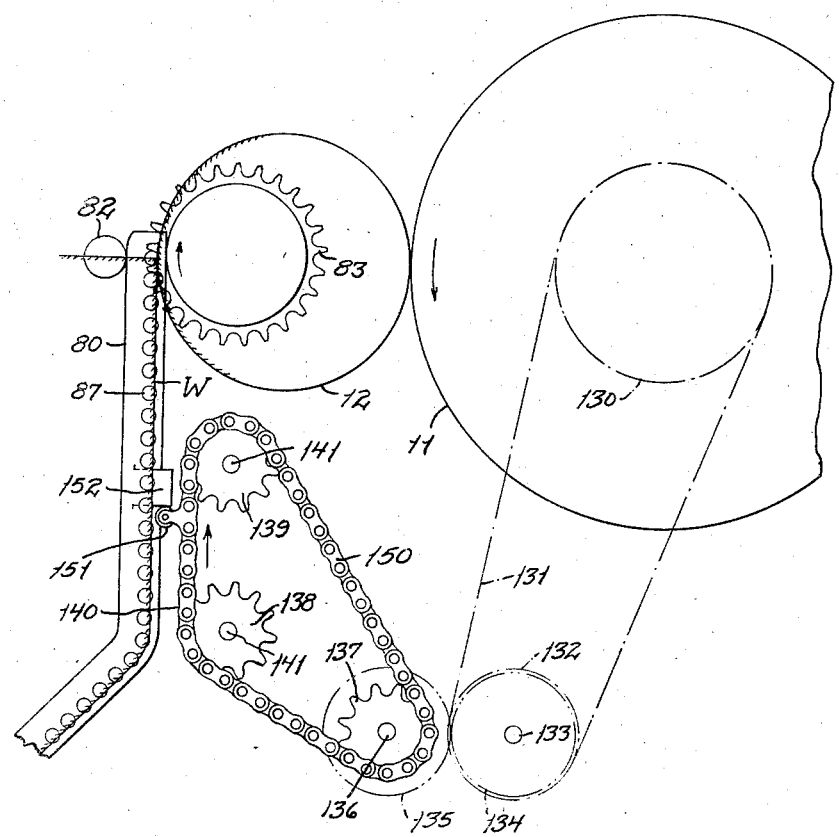

In the drawings, Fig. 1 is a plan view of my improved decorating mechanism; Fig. 2 is a vertical section through the mechanism, the plane of the section being indicated by the lines 2—2 on Fig. 1; Fig. 3 is a vertical section, as indicated by the offset lines of 3—3 on Fig. 2; and Figs. 4 and 5 are diagrammatic illustrations on an enlarged scale of the work advancing and progressing mechanism.

Referring again to the drawings, and especially to Figs. 1 and 2, the machine there shown is especially arranged for the continuous decoration of a plurality of vertical or nearly vertical angularly disposed connected surfaces of a workpiece, such as the sides of a cabinet or box illustrated at W. In general, the machine comprises a support or frame 10 carrying a vertically extending rotatably journalled pattern roll 11, and an aligned offset or transfer roll 12, which coacts with the periphery of the pattern roll and vertical surfaces of the workpiece, as the latter is moved along a work supporting table 14, to transfer a design from the pattern roll to the workpiece.

The pattern roll 11 is drivingly mounted on a shaft 20, which is journalled at its lower end in the frame 10, and at its upper end in a bearing or supporting plate 21, as will be hereinafter more fully described. The bearing plate 21 is mounted on and spaced from the frame 10 by a series of supporting bars or rods 22. The transfer or offset roll 12 is drivingly secured to a vertically extending shaft 23, which is journalled at its lower and upper ends in brackets 24, which have been mounted in a vertically extending shaft 25, to enable the offset roll to be swung away from and out of contact with its associated pattern roll.

The offset roll is normally maintained in contact with the pattern roll by springs 26, which are interconnected between respective brackets 24 and one of the frame members 22 heretofore mentioned. Accurate adjustment of the pressure between the two rolls is secured by adjusting screws 27. These screws are illustrated in Fig. 1 as being carried by the frame members 22 and abutting a tie-bar 28, which interconnects the two brackets 24.

The pattern roll is preferably provided with an intaglio printing plate. This plate is supplied with ink from a reservoir 30 by a pump mechanism 31, which draws the ink from the reservoir and forces it upwardly through conduits 32 into a point adjacent the upper region of the printing cylinder, where it falls by gravity along the printing plate.

The excess ink is removed from the printing plate by a scraper 35. Likewise, the ink remaining on the transfer roll, after the transfer has been made to the work, is likewise removed by a scraper 36. These scrapers each comprise a vertically extending doctor blade which is secured to a respective vertically extending shaft 37 axially reciprocable. These shafts are rotatably mounted in suitable brackets 38, carried by the frame 10. The scraper blades 35 and 36 are maintained in engagement with the periphery of the respective rolls by springs which are interconnected between a relatively stationary frame member and pins 34 which are secured to respective plate holder shafts 37.

The pattern and offset rolls are rotated, and the scrapers reciprocated axially of their respective rolls by a motor 41. As shown in Fig. 1, this motor is connected by a driving belt 42, with a gear reduction unit generally indicated at 43. The driving shaft 44 of this unit is connected by a chain 45 with a sprocket wheel 46, which is secured to a shaft 47, suitably journalled in the frame 10. Mounted on the inner end of the shaft 47 is a bevelled gear 48, which meshes with a similar bevelled gear 49, drivingly secured to the lower end of the pattern roll shaft 20.

The offset roll 12 is driven from the pattern roll shaft in timed relationship and at the same peripherial speed as the pattern roll. As illustrated, the pattern roll shaft 20 is drivingly secured to a sprocket wheel 50, the hub of which is journalled in the bearing plate 21, heretofore described. The sprocket wheel 50 is connected by a driving chain 52, with a sprocket wheel 53 mounted on a stub-shaft 54, which is journalled in the frame plate 21. Also secured to the stub-shaft 54 is a gear 55. This gear meshes with a gear 56 journalled about the axis of the pivot 25 about which the offset roll swings, as heretofore described. Drivingly connected to the gear 56 is a sprocket wheel 57, which, through the medium of a chain 58, drives another sprocket wheel 59. The sprocket wheel 59 is drivingly connected to the offset roll shaft 23. Thus, the offset roll is driven in synchronism with the pattern cylinder. The ratio of the gearing between the pattern shaft and the offset roll shaft 23 is such that the pattern roll 11 and the offset roll 12 are driven at the same peripheral speeds.

The ink pump 31 is also operated by the motor 41. As shown in Figs. 1 and 3, the pump is actuated by a crank pin 60, carried by a gear 61, which meshes with a gear 62, carried by a shaft 63 journalled in the frame member 10. The inner end of the shaft 63 is provided with a bevelled pinion 64, which meshes with a similar bevelled pinion 65, carried by a shaft 66 which is also journalled in the frame 10. Rotatably mounted on the shaft 66 is a sprocket wheel 67, which is constantly driven by a driving chain 68. This chain interconnects the sprocket wheel 67 with a sprocket wheel 69 (Fig. 2) on the drive shaft 47, heretofore described. The sprocket wheel 67 is selectively connected with its supporting shaft 66, by a sliding clutch 70, which is splined to such shaft and arranged to be moved axially along the shaft into and out of engagement with a clutch hub formation 71 on the sprocket wheel 67. An operating lever 72 is provided to shift the clutch 70 to the desired position and thus place the pump 60 into or out of operation, as desired.

The scraper roll shafts are reciprocated in the brackets 38 to prevent undue wear or marking of either of the offset roll or the pattern. The scrapers are moved vertically by a cam wheel 75, mounted on the end of a shaft 76 journalled in the frame 10. This cam is in constant engagement with the lower end of each of the scraper blade supporting bars 37, as indicated in Fig. 3.

The cam 75 is rotated by the pattern roll shaft 20. As illustrated in Fig. 2, the lower end of the pattern roll shaft 20 is provided with a sprocket wheel 76, which is connected by a driving chain 77, with a suitable sprocket wheel mounted on the lower end of the shaft 78, which carries the cam 75.

The form of the invention shown in the drawings is especially well adapted for the decorating or graining of the sides of cabinets, such as that shown at W. The cabinet or other workpiece is placed on a workholder 80 which slidably rests on the planular surface of the table 14. The workholder is provided with a guide rail 81, the inner and outer surfaces of which are of substantially the same contour as the contour of the surfaces of the workpiece to be decorated. This guide rail is gripped between a roller 82, and a sprocket wheel or gear 83, both of which are journalled in a bracket formation 86, hereinafter more fully described, but which maintains the axis of the roller in a predetermined spaced relation to the axis of the sprocket wheel 83. The roller 82 engages the inner surface of the workholder guide 81 while the sprocket wheel 83 engages a rack 87, formed on the outer surface of the workholder guide 81. This rack may be a regular toothed rack, or it may comprise, as shown, a sprocket chain suitably secured to the workholder. Thus, consequent upon the rotation of the sprocket 83, the workholder, together with the work, may be positively progressed, insuring accurate transfer of the design.

To maintain accuracy in the transfer of the design to the work, the workholder, at all times during the actual decorating operation, is positively gripped between the pressure roller 82 and the sprocket wheel 83, heretofore described. It will be noted from Fig. 4 that the axis of the sprocket wheel 83 is slightly offset from a line interconnecting the axes of the offset roll 23 and the pressure roller 82. This offset enables the application of the design to the corners of the workpiece, which, as illustrated, has comparatively small radii, without causing a distortion of the design, that might otherwise result due to a wiping or slipping action between the workpiece and the offset or transfer roller.

The decorating mechanism with which the present invention is concerned is well adapted either for mechanical or manual feeding of the work into a decorating position, that is into a position to be engaged by the offset roll.

The sprocket wheel or gear 83, which progresses the workholder 80, is driven in timed relation with the pattern roll 11. As shown in Fig. 2, the shaft 44 of the gear reduction unit 43 is drivingly connected by a chain 90, with a sprocket wheel 91, which is rotatably journalled in a bushing 92 mounted in the frame 10. Journalled in the hub of the sprocket 92 is a shaft 93, which has a splined driving connection with a bevelled gear 94. The gear 94 is journalled in the bracket 86, heretofore described, and is in constant meshing engagement with a bevelled pinion 95, which is drivingly secured to the lower end of the shaft 35, which carries the workholder progressing gear 83.

The driving connection between the shaft 93 and the sprocket wheel 91, which is driven from the gear reduction unit, comprises a clutch member 100, which is axially slidable on and splined to the shaft 93. This clutch has a single clutch tooth 101 arranged to engage a complementary recess formed on the hub face of the sprocket wheel 91. The ratio of the various gearing is such that the sprocket wheel 91 makes one complete revolution for each revolution of the pattern roll 11. Therefore, a definite timed relationship is maintained between the work progressing mechanism and the pattern roll.

When the work is manually fed to the decorating mechanism, the bracket 86 is slid outwardly, that is, to the left, in Figs. 1 and 2, moving the workholder to a position where a workpiece carried thereby would be entirely out of contact with the offset roll 12. This is accomplished by the operation of a control lever 110, which is secured to a sprocket wheel 111, mounted on a shaft 113 journalled in the frame 10. The sprocket wheel 111 is drivingly connected, as by a drive chain 112, with a shaft 114, which is journalled in bearings 115, carried by the frame 10. The inner end of the shaft 114 is provided with a pinion 116, arranged to mesh with a toothed rack 117. This rack is secured to the bracket 86, which, as shown in the drawings, is slidably mounted in horizontally extending guideways 102, in the frame 10. Thus, consequent upon operation of the lever 110, the bracket 86, together with the workholder driving gear 83, may be moved to the left, as indicated by the arrow in Fig. 2. This movement of the workholder brings the work out of contact with the offset roll 12.

The movement of the workholder away from the offset roll, as above described, is automatically accompanied by a disconnection between the workholder drive and the power mechanism. As shown in the drawings, the clutch 100 is provided with a clutch ring 105, which is connected by a pair of shifter rods 107, with the bracket 86. This arrangement is highly advantageous, as it is sometimes desired that the actual decorating operating commence at a point remote from the end of the work, as, for instance, the point indicated by the arrow 103 on Fig. 1. In such instance, and with the mechanism above described, the operator places the work on the workholder while it is in a withdrawn or left-hand position, and positions the work-holder so that the desired point is substantially opposite the transfer roll 12. This positioning of the workholder is facilitated by the fact that the clutch 100 is now disengaged. The operating lever 110 is next actuated to move the workholder 80 toward the right and bring the work W into contact with the offset roll 12. However, actual contact with such roll may be prevented, by the engagement of the clutch tooth 101 with the face of the driving sprocket wheel 91, until such time as the recess in such sprocket wheel hub aligns with the tooth 101 of the clutch, at which time continued pressure on the lever 110 brings the work into contact with the offset roll and simultaneously makes the driving connection between the work progressing means and the power unit. The timed relationship of this movement is such that a definite part of the pattern may be applied to the work at its point of beginning, namely, the point W2.

As heretofore mentioned, the decorating apparatus is provided with a power-actuated feeding mechanism to advance the work into engagement with the workholder advancing sprocket wheel 83. This mechanism is best illustrated in Figs. 1 and 5. As there shown, the work feeding mechanism comprises a chain 150, one stretch 140 of which runs parallel to a guide rail 153, which is approximately tangential to the transfer roll 12. A workholder is placed in engagement with this rail by the operator and retained thereagainst. The feed chain 150 is provided with a lug 151, which engages an adjustably mounted block 152 carried by the workholder by the operator. The chain 150 is progressed, as will be hereinafter described, in timed relationship with the pattern roll 10 and advances the work to the bight of the work progressing sprocket wheel 83, and the compression roller 82, whereupon such sprocket wheel 83 picks up the workholder and advances during the application of the decoration to the work. The driving mechanism for the sprocket wheel 83 and the feed chain 150 is such that the sprocket will advance the work at a higher rate of speed than the feeding chain 150, so that the lug 152 of the workholder moves away from the coacting feed chain lug 151 and prevents smudging of the applied decoration.

The work feeding chain 150 is driven from the pattern roll shaft 20, heretofore described, as being driven by the motor 41. As shown in the drawings, a sprocket wheel 130 is secured to the shaft 20 and is drivingly connected by a chain 131 with a sprocket wheel 132 mounted on a vertically extending shaft 133 carried by the frame 10. Also mounted on the shaft 133 is a gear 134, which meshes with a gear 135, carried by a shaft 136, also journalled in the frame 10. The gear 135 is drivingly connected with a sprocket wheel 137 around which the feed chain 150 is looped. The course 140 of the feed chain is maintained parallel with the guide rail 153 (Fig. 1) by a pair of sprocket wheels 138 and 139, which are journalled on the respective shafts 141 carried by the frame 10.

The driving relation between the pattern roll shaft 20 and the feed chain 150 is such that the pattern roll 11 will make two complete revolutions while the lug 151 of the feed chain 150 completes one circuit about its course, namely, the sprockets 137, 138 and 139. Likewise, the ratio of the length of the feeding chain 150 to the length of the periphery of the pattern cylinder is such that the peripheral speed of the pattern cylinder is greater than the peripheral speed of the chain 150, thus the chain moves at a slower rate of speed than the work progressing sprocket wheel 83, but in timed relationship with the pattern.

When the work-advancing mechanism, above described, is used, the operator places the work on a workholder and positions the workholder against the guide rail 153 in the path of the advancing feed chain lug 151. The work is fed to the workholder feed sprocket 83 by the feed chain 150 during an idle or non-decorating cycle of operation of the mechanism. The timing of the mechanism is such that the pattern is applied to the workpiece on the next succeeding cycle of operation. Thus, the decorating roll applies a decoraive coating to a workpiece on alternate cycles of operation of the mechanism, and inasmuch as a cycle of operation is measured by one complete revolution of the pattern roll 11, the same pattern is applied to the workpieces in substantially the same manner.

We claim:

1. A surface decorating apparatus comprising a frame, a work decorating roll rotatably mounted thereon, means to rotate said roll, a workholder, means to progress said workholder in registration with the rotating roll to cause the design to be impressed on work carried thereby, a disconnectible power drive for said means, means for engaging said drive as the workholder is moved toward the decorating roll and means to simultaneously move said workholder away out of contact with said roll and disconnect said power operated progressing means from its drive.

2. A surface decorating apparatus comprising a frame, a work decorating roll rotatably mounted on said frame, means to rotate said roll, a workholder, retaining means to retain said workholder in a position with a workpiece carried thereby in contact with said decorating roll, means to progress said workholder between the retaining means and in registration with the roll to cause the design to be impressed on work carried thereby, a disconnectible power drive for said means, means for engaging said drive as the workholder is moved toward the decorating roll and means to move said workholder and retaining means away from the transfer roll as a unit and simultaneously disconnect said power drive from the progressing means.

3. A surface decorating mechanism comprising a frame, a work decorating roll rotatably supported by said frame, power operated means to rotate said roll, a workholder, a power operated driving means for said workholder and having a geared connection therewith, a clutch between said driving means and said geared connection, means to move said workholder toward said transfer roll, and means to cause said clutch to connect said driving means with said geared connection in timed relationship with the decorating roll, consequent upon the movement of said workholder toward said work.

4. A surface decorating mechanism comprising a frame, a work decorating roll rotatably supported by said frame, power operated means to rotate said roll, a work-holder, guiding means to guide the workholder while the work is being decorated by said roll, including a member adapted and arranged to progress the work through such means, a disconnectible power drive connection for said member, and means for connecting the same in timed relationship to the member, means to move said workholder and guiding means bodily toward and from said transfer roll, and means to cause said driving connection to be made consequent upon the movement of said workholder guide means toward said roll, and to be disconnected consequent upon the movement of the workholder guide means away from said roll.

5. A surface decorating mechanism comprising a frame, a pattern roll and a coacting transfer roll mounted in said frame, a workholder slidably mounted on said frame and having a rack thereon, a driving gear for said workholder and arranged and adapted to coact with said workholder rack while a workpiece positioned on said workholder is being decorated by said transfer roll, said gear being shiftable to move the workholder and thereby the work out of and into contact with said transfer roll, a power driving mechanism for said pattern roll and said gear and including a clutch between the source of power and the gear, to connect the same in timed relationship with the pattern roll and means to move said gear to shift the workholder toward and from the transfer roll and simultaneously move said clutch out of and into a power connecting relation.

6. A surface decorating machine comprising a frame, a pattern roll rotatably mounted on said frame with its axis in a substantially vertical position, a transfer roll rotatably mounted on said frame in peripheral contact with said pattern roll, a driving connection between said rolls, a workholder, a support for said workholder and on which said workholder may slide in a substantially horizontal plane, a rack on said workholder substantially conforming in contour to the contour of the work to be decorated, a bracket slidably mounted in said frame for movement in a substantially horizontal plane toward and away from the axis of said transfer roll, a gear carried by said bracket, means carried by said bracket to normally retain the workholder in cooperative engagement with said gear, power operated driving means to drive said pattern roll, and means operated automatically consequent upon the movement of said bracket toward the transfer roll to couple said gear with said driving means.

7. In a surface decorating mechanism, a frame having a decorating roll adapted and arranged to apply a decorative coating to a workpiece, a workholder slidably mounted on said frame, a racklike formation fixed to said workholder, a gear carried by said frame and adapted and arranged to mesh with said rack to progress said workholder during the decorating operation, the diameter of said gear being substantially smaller than the diameter of said roll whereby the driving connection between said gear and said workholder may be broken at a greater rate of speed than the contact between the periphery of said roll moves away from the work carried by the workholder, and means to drive said roll and gear at substantially identical peripheral speeds to thereby prevent smudging of a design being applied to the work by the roll.

8. In a surface decorating machine for decorating individual workpieces, a roll adapted and arranged to apply a decorative coating to successive workpieces by rolling contact therewith, means to rotate said roll, means to advance an individual workpiece into contact with said roll, and means to drive said advancing means to cause a workpiece to advance into contact with said roll at a slower rate of surface speed than the speed of the surface of said roll, wherein the work progressing at the same peripheral speed as the roll will move away from the advancing means and thus prevent smudging of the applied decoration.

9. In a surface decorating machine for individual workpieces, a roll adapted and arranged to apply a decorative coating to the work by a rolling contact with the work, means to positively progress an individual workpiece while it is in contact with said decorating roll and at the same surface speed as the peripheral speed of said roll, means to drive said roll and progressing means in synchronism, means to advance the work to said progressing means, and means to drive said advancing means at a slower rate of speed than the speed of said progressing means, whereby said progressing means upon engagement with the work will draw the work away from the advancing means.

10. In a surface decorating machine for decorating individual workpieces, a pattern roll, a transfer roll adapted and arranged to transfer a decorative coating from said pattern roll to a workpiece, means to rotate said rolls, a workholder, a feeding chain having means thereon to engage and advance said workholder until the work carried thereby is in surface contact with said roll, means to drive said advancing means at a slower rate of speed than the peripheral speed of said transfer roll but in timed relation with said pattern roll.

11. In a surface decorating machine for decorating individual workpieces, a transfer roll adapted and arranged to apply a decorative coating to a workpiece by rolling contact therewith, means to rotate said roll, a workholder having a rack thereon, a gear meshing with said rack while the work is being decorated to positively progress the work while it is in contact with said roll, a work advancing means to advance the workholder until the rack thereon is engaged by said gear and means to drive said advancing means at a slower rate of speed than the peripheral speed of the surface of said gear whereby said gear will cause the workholder to be drawn out of engagement with said advancing means.

12. A surface decorating mechanism comprising a frame, a pattern roll and a coacting transfer roll mounted in said frame, a workholder slidably mounted on said frame and having a rack thereon, a driving gear for said workholder and arranged and adapted to coact with said workholder rack while a workpiece positioned on said workholder is being decorated by said transfer roll, a work feeding chain spaced from said gear and adapted and arranged to engage and shove a workholder into engagement with said gear, a power driving mechanism for said rolls, the feeding chain and said workholder progressing gear, said driving mechanism being arranged and adapted to rotate said rolls at the same peripheral speed and to rotate said gear to cause it to move the work at the same surface speed as the peripheral speed of said rolls, and to operate said feeding chain to cause it to advance the work at a slower rate of speed than the work is advanced by said gear, and wherein said chain is arranged and adapted to progress workpieces on predetermined revolutions of said pattern roll.

13. A surface decorating machine comprising a frame, a pattern roll rotatably mounted on said frame with its axis in a substantially vertical position, a transfer roll rotatably mounted on said frame in peripheral contact with said pattern roll, a driving connection between said rolls, a workholder, a support for said workholder and on which said workholder may slide in a substantially horizontal plane, a rack on said workholder substantially conforming in contour to the contour of the work to be decorated, a gear carried by said frame, work feeding means carried by said frame to advance a workholder into cooperative engagement with said gear, power operated driving means to drive said pattern roll, said gear and said advancing means, and arranged and adapted to progress said gear at the same peripheral speed as the peripheral speed of said pattern roll and to progress said advancing means one-half as fast as the peripheral speed of the pattern roll.

14. In a surface decorating mechanism, a frame having a decorating roll adapted and arranged to apply a decorative coating to a workpiece, a workholder, slidably mounted on said frame, a racklike formation fixed to said workholder and substantially conforming in contour to the contour of the surfaces of the workpiece to be decorated, a gear carried by said frame and adapted and arranged to mesh with said rack to progress said workholder during the decorating operation, the diameter of said gear being substantially smaller than the diameter of said roll whereby the periphery of said gear moves away from said workholder at a greater rate of speed than the periphery of said roll moves away from the work carried by the workholder, and means to drive said roll and gear at substantially identical peripheral speeds to thereby prevent smudging of a design being applied to the work, means to advance said workholder into coacting relation with said gear, and means to drive said workholder to progress said workholder at a rate of speed which is slower than the rate of speed at which the workholder is advanced by said gear.

LLOYD V. CASTO.
GUIDO von WEBERN.
EDWARD WILLIAM HAMANT.